United States Patent [19]
Berger

[11] 4,286,005
[45] Aug. 25, 1981

[54] INK RESERVOIR ELEMENT FOR USE IN A MARKING INSTRUMENT, AND METHOD AND APPARATUS FOR PRODUCING SAME

[75] Inventor: Richard M. Berger, Midlothian, Va.

[73] Assignee: American Filtrona Corporation, Richmond, Va.

[21] Appl. No.: 17,106

[22] Filed: Mar. 5, 1979

[51] Int. Cl.$^3$ .......... B32B 3/30; B43K 5/02

[52] U.S. Cl. .......... 428/167; 131/340; 401/198; 401/199; 428/171; 428/172; 428/364; 428/397; 428/398

[58] Field of Search .......... 428/167, 171, 172, 397, 428/398, 364; 401/198, 199; 131/267

[56] References Cited

U.S. PATENT DOCUMENTS

| | | | |
|---|---|---|---|
| 3,095,343 | 6/1963 | Berger | 156/180 |
| 3,111,702 | 11/1963 | Berger | 15/563 |
| 3,542,634 | 11/1970 | Such | 428/167 |
| 3,767,520 | 10/1973 | Dick | 401/198 |
| 3,993,820 | 11/1976 | Repke | 428/167 |
| 4,189,511 | 2/1980 | Levers | 428/167 |

FOREIGN PATENT DOCUMENTS

| | | |
|---|---|---|
| 1225998 | 3/1971 | United Kingdom . |
| 1273418 | 5/1972 | United Kingdom . |
| 1391421 | 4/1975 | United Kingdom . |

*Primary Examiner*—Ellis P. Robinson
*Attorney, Agent, or Firm*—Holman & Stern

[57] ABSTRACT

An ink reservoir element for use in a marking instrument is disclosed, which combines good ink holding capacity and good ink release properties with a wide variety of inks. The ink reservoir element is formed from a coherent sheet of flexible thermoplastic fibrous material, such as a spunbonded polyester fabric or a foam-attenuated extruded polyester fabric, which has been uniformly embossed with a series of parallel grooves. The embossed sheet is compacted and bonded into a dimensionally stable rod-shaped body whose longitudinal axis extends parallel to the embossed grooves. A method and apparatus is disclosed for continuous production of the ink reservoir elements from a continuous web of the fibrous sheet material.

6 Claims, 4 Drawing Figures

10
10a
10b
10c
12
14
16
18
20
22
24
26
28
30
34
36
38
40
41
42
43
44
46
48
4
4

INK RESERVOIR ELEMENT FOR USE IN A MARKING INSTRUMENT, AND METHOD AND APPARATUS FOR PRODUCING SAME

BACKGROUND OF THE INVENTION

This invention relates to marking or writing instruments and, more particularly, to ink reservoir elements for use in such instruments.

Ink reservoir elements for use in marking and writing instruments have conventionally been formed of a fibrous bundle compacted together into a rod-shaped unit having longitudinal capillary passageways which extend therethrough between the fibers and which serve to hold the ink and release it at the required controlled rate. For a number of years, the fibrous material generally employed was cellulose acetate fibers, which could readily be heat-bonded together with suitable plasticizers into a unitary body, and which were compatible with all of the ink formulations then in use. In recent years, however, ink formulations became more sophisticated so that the writing instruments did not need to be capped to prevent the ink from evaporating. Such new ink formulations required formic acid, which was not compatible with cellulose acetate. For this reason, various thermoplastic fibers and, in particular, polyester fibers, had to be used in place of the cellulose acetate fibers for producing the ink reservoir elements.

Various problems have been encountered in attempting to bond polyester fibers together into a unitary ink reservoir body. When adhesives have been employed in the bonding operation, such adhesives have interfered with the capillary action and ink absorption of the units. Efforts made to heat-bond the polyester fibers to each other without any additive adhesive have not met with much success. Because of the narrow softening point of polyester, it has not been possible to heat-bond drawn polyester fibers such as tow. Undrawn polyester fibers could be heat-bonded together, but produced an unusable product because of shrinkage during processing and lack of stability in the presence of inks at the temperature required for storage of writing instruments. Consequently, polyester fiber ink reservoir elements have heretofore been commercially produced in the form of an unbonded bundle of fibers compacted and held together in a rod-shaped unit by means of a porous film overwrap, and generally including a small diameter plastic "breather" tube disposed between the fibrous bundle and the overwrap and serving as an air release passage. Sometimes, the design of the writing instrument barrel precludes the necessity of a separate "breather" tube.

The film-overwrapped polyester fiber ink reservoir elements, when made with parallel continuous-filament fibers, have had adequate ink holding capacity and ink release properties for use with certain types of marking or writing instruments, for example, those employing fiber tips. However, they have not been successful with the more recent roller marker type of writing instrument, due to the fact that the roller markers require a faster ink release then the conventional fiber tips. Efforts to lower the fiber density and/or change the fiber size to increase the ink release have had limited success because the release is not uniform from start to finish. Also, lowering the fiber density has been found to reduce the ink holding capacity of the reservoir. Forming the reservoir from staple fibers randomly laid, rather than from continuous-filament parallel fibers, has been found to increase the ink release properties of short-length reservoirs, but at the longer lengths required for adequate ink holding capacity, this construction lacks the capillarity to function. Thus, it has not previously been possible to form a polyester fiber ink reservoir element having the proper combination of ink holding capacity and ink release properties satisfactory for use in the roller marker type of writing instrument.

SUMMARY OF THE INVENTION

It is, accordingly, a primary object of the present invention to provide an ink reservoir element which is compatible with all presently employed inks and which has the proper combination of ink holding capacity and ink release properties for use with various types of marking or writing instruments, including roller markers.

Another object of the invention is to provide an ink reservoir element in accordance with the preceding object, which can be readily formed as a bonded unitary body with one or more integral air release passages, if desired, or necessary, depending on the barrel design, without the need for any overwrap material or for a separate breather tube, although in some instances the product may be overwrapped in a conventional manner to facilitate filling the reservoir with ink.

A further object of the invention is to provide an ink reservoir element in accordance with the preceding objects, wherein the fiber density may be reduced without a corresponding reduction in the ink holding capacity of the reservoir.

Still another object of the invention is to provide a suitable method and apparatus for continuous automated production of ink reservoir elements in accordance with the preceding objects.

The above and other objects are achieved in accordance with the present invention by providing an ink reservoir element formed of a coherent sheet of flexible thermoplastic fibrous material composed of an interconnecting network of randomly arranged, highly dispersed, continuous-filament thermoplastic fibers which are bonded together at the filament junctions. At least one surface of the sheet is uniformly embossed with a series of parallel grooves. The embossed sheet is formed or compacted and bonded into a dimensionally stable rod-shaped body whose longitudinal axis extends parallel to the embossed grooves. The ink reservoir element is provided with at least one longitudinal peripheral slot extending continuously the entire length of its body and serving as an air release passage if a "breather" passage is required for the particular barrel design. Such ink reservoir construction is compatible with all inks presently being employed and exhibits the proper combination of ink holding capacity and ink release properties so as to render it suitable for use with various types of writing instruments, including roller markers and plastic nibs.

The ink reservoir elements in accordance with the present invention may be readily and easily manufactured in predetermined lengths and cross-sectional sizes and shapes by a continuous automated process from a continuous web of the flexible thermoplastic fibrous coherent sheet material. At least one surface of the web is uniformly embossed with a series of parallel longitudinally extending grooves. The embossed web is then compacted into a rod-like formation whose longitudinal axis extends parallel to the embossed grooves. The formed embossed web is thereafter passed through a heated confined area having a cross-sectional size and shape slightly greater than or equal to the predetermined cross-sectional size and shape, and steam or other heated gas is introduced into the compacted embossed web during its passage through the confined area, thereby bonding the compacted embossed web into a dimensionally stable rod-shaped body having the predetermined cross-sectional size and shape. The confined area may include at least one longitudinal peripheral ridge extending thereinto along its length so as to form in the rod-shaped body a corresponding longitudinal peripheral slot extending continuously the entire length of the body. The rod-shaped body is then preferably cooled to essentially room temperature and finally shaped to its desired cross-section after which it is transversely cut into the predetermined lengths.

BRIEF DESCRIPTION OF THE DRAWINGS

Other features and advantages of the present invention will be better understood from the following detailed description of preferred embodiments thereof, in conjunction with the accompanying drawings, in which.

DESCRIPTION OF PREFERRED EMBODIMENTS

Figures 1, 2, 3, 4:
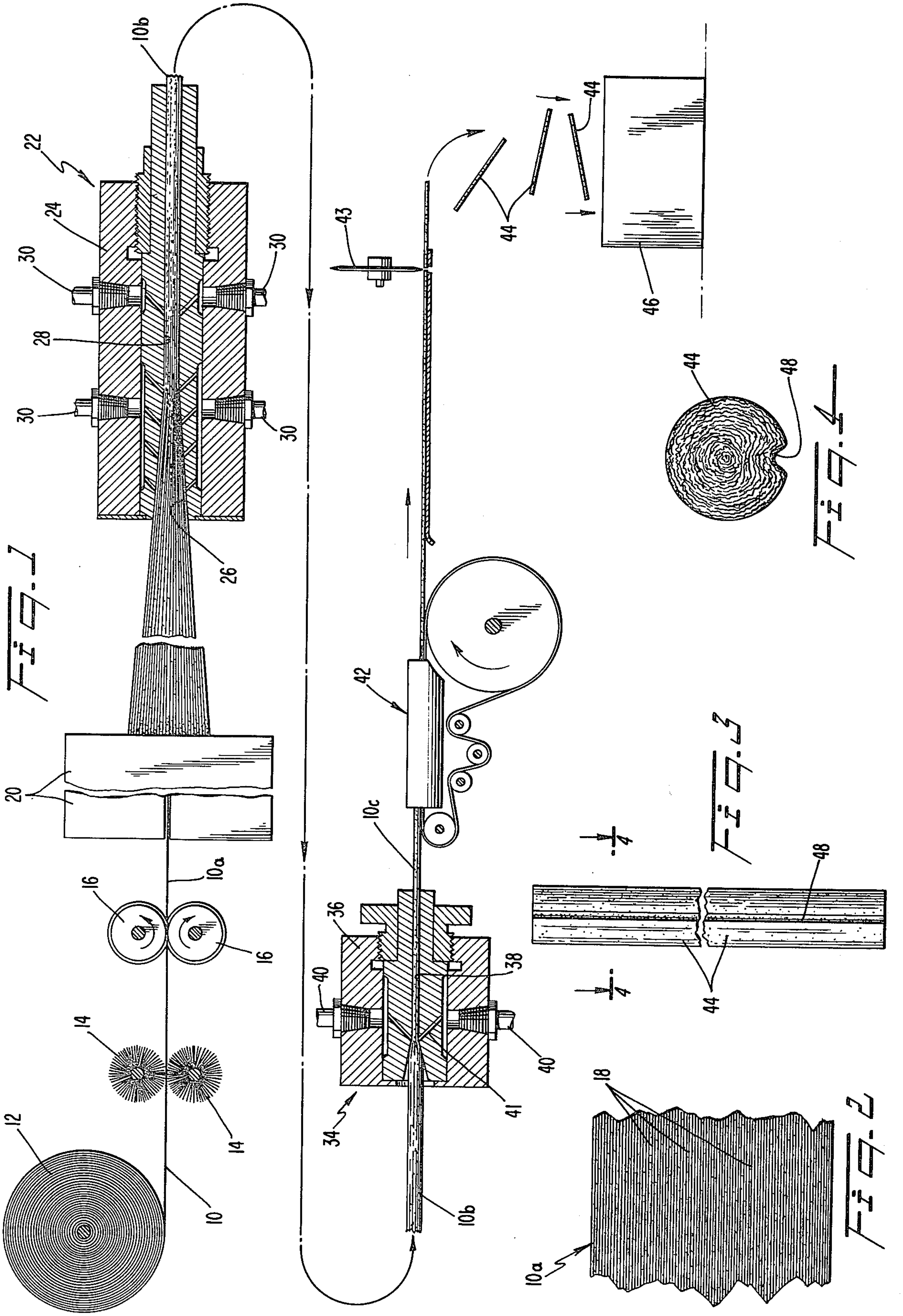
FIG. 1 presents schematically a production-line assembly of stations through which a continuous web of flexible thermoplastic fibrous coherent sheet material is passed in the continuous automated production of ink reservoir elements in accordance with the present invention.
FIG. 2 is a fragmentary top view of the fibrous web after it has passed the embossing station and before it has entered the forming station of the production-line assembly shown in FIG. 1.
FIG. 3 is a front elevational view of an ink reservoir element produced in accordance with the present invention.
FIG. 4 is a cross-sectional view taken along the line 4—4 of FIG. 3.

Referring now to FIG. 1 of the drawings, a continuous web 10 of flexible thermoplastic fibrous coherent sheet material, taken from a supply roll 12, is employed as the starting material for the continuous production of ink reservoir elements in accordance with the present invention. The fibrous sheet material is composed of an interconnecting network of randomly arranged, highly dispersed, continuous-filament thermoplastic fibers, such as, for example, polyester, nylon, polypropylene, high density polyethylene, or polyurethane fibers, the fibers being either self-bonded or adhesive-bonded together at the filament junctions. The preferred fibrous sheet materials meeting this description are the various spunbonded fabrics, such as the spunbonded polyester commercially available under the trademark "REEMAY" from E. I. DuPont de Nemours and Company, Wilmington, Del.; and the spunbonded nylon commercially available under the trademark "CEREX" from Monsanto Co., St. Louis, Mo. Other suitable fibrous sheet materials meeting the above description are foam-attenuated extruded fabrics made by a process wherein a foamed thermoplastic polymer melt is extruded through a slot dye, and the resulting extrudate is cooled, drawn down and stretched into a coherent sheet of interconnecting fibers.

The continuous web 10 of fibrous sheet material taken from the supply roll 12 is preferably first subjected to a wetting operation, for example, by applying water to the web by means of an annular brush or spray such as that schematically shown in FIG. 1 and designated by the numeral 14. The purpose of the wetting step is to uniformly wet the web so as to render it conformable for subsequent embossing. Such uniform wetting will generally require a wetting agent for the thermoplastic fibers of the sheet material. If the sheet material as supplied does not contain such wetting agent, then the wetting step should be carried out with an aqueous solution containing such wetting agent, for example, a 10% aqueous solution of Triton X-100 or other suitable commercially available wetting agents.

The wetting step may be eliminated entirely with certain starting materials, particularly if they include a wetting agent and the material 10 may be passed either in a substantially dry form or wetted as at 14 through a pair of circumferentially grooved embossing rolls 16, which preferably are heated to temperatures within the range of from about 250° F. to about 350° F. The embossed web **10*a* emerging from the embossing rolls 16, as illustrated in FIG. 2, has its surface uniformly embossed with a series of parallel longitudinally extending grooves 18. The surfaces of the embossing rolls 16 should be such as to provide the grooves 18 with a width within the range of from about 0.005 inch to about ⅛ inch, and a depth of at least about 0.0015 inch but less than the tearing point of the sheet material. The embossed web, if it has been previously wetted, is then passed through a hot air dryer 20 wherein it is heated to a temperature below the melting point of the thermoplastic fibrous material (e.g., less than about 500° F. when the material is composed of polyester fibers) so as to remove therefrom the excess moisture still remaining therein from the wetting step. The embossing step effectively breaks down the web or sheet 10** to enable the same to be formed and compacted in the following processing stations.

The dried embossed web is then passed through a compacting or forming and heat-bonding apparatus, which may be essentially identical to the steam-injecting apparatus described in detail in both the Berger U.S. Pat. No. 3,095,343, issued June 25, 1963, and the Berger U.S. Pat. No. 3,111,702, issued Nov. 26, 1963, both of which patents are incorporated herein by reference with respect to their detailed description of the construction of such steam-injecting apparatus. Preferably, however, a forming heat such as shown at 22 is utilized for the compacting and heat-bonding operation, this apparatus comprising a tube or nozzle 24 having a funnel-shaped mouth or entrance 26 leading into a heat-bonding passageway 28 extending through the tube 24. The passageway 28 defines a confined area having a cross-sectional size and shape slightly greater than or equal to the cross-sectional size and shape desired for the ink reservoir elements which are to be produced. The apparatus 22 preferably includes conventional heater elements (not shown) to maintain the block at about 400°-450° F. and is provided with hot gas inlets 30 leading into the passageway 28 for admitting steam or other heated gas such as air into the passageway 28. As in the aforementioned issued Berger U.S. Pat. Nos. 3,095,343 and 3,111,702, the steam inlets 30 are preferably designed so as to direct steam or heated gas, preferably at temperatures of about 500°-550° F., into the passageway 28 under pressure and at approximately a 45-degree angle with respect to the longitudinal axis of the passageway 28, whereby the heated gas travels counter-current to the direction of movement of the web of fibrous material and exits through the mouth or entrance end 26. The passageway 28 may also include at least one longitudinal peripheral ridge (not shown) extending thereinto along its length to form integral "breather" tubes, if desired.

As the dried embossed web of fibrous sheet material enters and passes through the mouth portion 26, it becomes formed and compacted together into a rod-like formation whose longitudinal axis extends parallel to the embossed grooves 18 on the surface of the web. As the compacted embossed web enters and passes through the passageway 28, it is subjected to heated gas treatment in the confined area defined by the passageway 28 and thereby becomes heat-bonded into a dimensionally stable rod-shaped body **10*b* having a cross-sectional size and shape desired for the ink reservoir elements which are to be produced. It has been found that it is sometimes desirable to form the rod slightly oversized in the apparatus 22, such as 6.2–6.4 mm. for a final product of 6.0 mm, the final sizing to take place in the cooling head 24 to be described in more detail hereinafter. The final cross-sectional shape may also be partially defined by a longitudinal peripheral ridge extending into the passageway 28** along its length, as described more fully hereinafter.

The rod-shaped body **10*b* emerging from the compacting and heat-bonding apparatus 22 is then preferably passed through an air-injecting apparatus 34, wherein it is cooled to essentially room temperature in order to enhance its dimensional stability prior to being cut to the length desired for the ink reservoir elements to be produced. The air-injecting apparatus 34 may be essentially identical in structure with the air-injecting apparatus described in detail in the aforementioned issued Berger U.S. Pat. Nos. 3,095,343 and 3,111,702, both of which patents are incorporated herein by reference with respect to their detailed description of the construction of such air-injecting apparatus. Basically, such apparatus as shown in FIG. 1 comprises a tube or nozzle 36 having a cooling passageway 38 and air inlets 40 leading into the passageway 38. The cooling passageway 38 has a cross-sectional size and shape sufficient to accomodate the rod-shaped body 10*b*, and may be slightly smaller to form the final cross-section of the product 10*c*. As the rod-shaped body 10*b* passes through the cooling passageway 38, it is subjected to treatment with air which is passed into the cooling passageway 38 by way of the air inlets 40. Preferably, such air is perfectly dry, has a temperature of 90° F. or below, and is maintained under a pressure of between 50 and 100 p.s.i.g. Moreover, as described in detail in the aforementioned issued Berger U.S. Pat. Nos. 3,095,343 and 3,111,702, the air inlets 40 are preferably designed so as to direct air onto the rod-shaped body counter-current thereto through ports 41 and at an angle of substantially 45 degrees to the longitudinal axis thereof, although air may be passed counter-current, co-current or at right angles to the passageway 38**.

Any conventional pulling or transporting mechanism such as the continuous belt means shown schematically at 42 may be utilized to draw the material through the various processing stations. The cooled rod-shaped body **10*c* is then passed to a cutter 43 where it is cut transversely into the lengths desired for the ink reservoir elements 44, which are then stored in a suitable container 46**.

As shown in FIGS. 3 and 4, the ink reservoir elements 44 produced in accordance with the present invention may be provided with a longitudinal peripheral slot 48 extending continuously the entire length thereof. The slot 48 is formed in the rod-shaped body **10*b* during its passage through the compacting and heat-bonding apparatus 22 by means of the longitudinal peripheral ridge extending into and along the length of the heat-bonding passageway 28. The purpose of the slot 48 is to provide the ink reservoir element 44 with an integral air release passage for those applications where the design of the barrel requires a "breather" means so as to avoid the necessity for the separate piece of plastic breather tubing required in the porous film-overwrapped ink reservoir elements of the prior art. If desired, the ink reservoir element may be provided with more than one longitudinal peripheral slot 48 by providing the heat-bonding passageway 28 of the compacting and heat-bonding apparatus 22** with a corresponding number of longitudinal peripheral ridges.

For certain types of ink-filling means conventionally used, it may still be desirable to wrap the product with a porous film as in the prior art, but in many uses of the reservoir of this invention which is substantially self-sustaining and shape-holding, such overwrap may be dispensed with.

In the ink reservoir elements produced in accordance with the present invention, the embossed parallel grooves 18 extend longitudinally with respect to the rod-shaped body of the element, and hence, provide the element with the uniform capillarity and ink holding capacity properties characteristic of the prior art film-overwrapped ink reservoir elements made with parallel continuous-filament fibers. Moreover, since the fibrous coherent sheet material from which the ink reservoir elements are made is composed of fibers which are disposed in a random arrangement, it provides the ink reservoir elements with ink release properties characteristic of the prior art film-overwrapped ink reservoir elements made from randomly laid staple fibers. Such combination of high ink holding capacity and relatively fast ink release properties renders the ink reservoir elements of the present invention highly versatile for use with various types of marking or writing instruments, including roller markers and plastic nibs. In addition, particularly when the thermoplastic fibrous coherent sheet material is one composed of polyester fibers, the ink reservoir elements in accordance with the present invention are compatible with all presently employed inks. Furthermore, since the ink holding capacity properties of the elements are a function of the embossed parallel grooves, it should be possible to produce ink reservoir elements in accordance with the present invention having different ink holding capacities merely by varying the size of the embossed grooves. Toward this end, as noted above, the width of the embossed grooves may be varied within the range of from about 0.005 inch to about ⅛ inch, and the depth of the embossed grooves may be varied within the range of from about 0.0015 inch up to a maximum depth less than the tearing point of the fibrous sheet material.

In addition to their unique combination of ink holding capacity and ink release properties, the ink reservoir elements in accordance with the present invention offer other significant advantages over the film-overwrapped fiber ink reservoir elements of the prior art. First of all, the ink reservoir elements in accordance with the present invention can be readily formed as bonded unitary bodies with an integral air release passage, without the need for any overwrap material or for a separate breather tube. Secondly, with the prior art film-overwrapped fiber ink reservoir elements, the ink holding capacity is highly dependent upon the fiber density, and a commercially acceptable ink holding capacity generally requires a relatively high fiber density. With the ink reservoir elements of the present invention, on the other hand, variations in fiber density have little, if any, effect upon the ink holding capacity, and the same commercially acceptable ink holding capacity can be achieved at a much lower fiber density. Hence, in comparison with the prior art film-overwrapped fiber ink reservoir elements, the ink reservoir elements in accordance with the present invention can offer the same ink holding capacity with a substantial savings in fiber weight plus the savings of the overwrapping material and the plastic breather tubing.

The embodiments of the invention in which, an exclusive property or privilege is claimed are defined as follows:

1. An ink reservoir element for use in a marking instrument, comprising a coherent sheet of flexible thermoplastic fibrous material compatible with formic acid compacted together and bonded into a dimensionally stable rod-shaped body, said fibrous material being composed of an interconnecting network of randomly arranged, highly dispersed, continuous-filament thermoplastic fibers which are bonded together at the filament junction; at least one surface of said sheet being uniformly embossed with a series of parallel grooves extending longitudinally with respect to said rod-shaped body, forming capillaries capable of transporting ink which extend longitudinally from end to end of the finished element.

2. The ink reservoir element of claim 1, wherein said thermoplastic fibers are polyester fibers.

3. The ink reservoir element of claim 1, wherein said embossed grooves have a width within the range of from about 0.005 inch to about ⅛ inch, and a depth of at least about 0.0015 inch but less than the tearing point of said sheet.

4. The ink reservoir element of claim 1, wherein said rod-shaped body is provided with at least one longitudinal peripheral slot extending continuously the entire length of said body.

5. The ink reservoir element of claim 1, wherein said fibrous material is a spunbonded fabric.

6. The ink reservoir element of claim 1, wherein said fibrous material is a foam-attenuated extruded fabric.

* * * * *